(12) United States Patent
Mellings et al.

(10) Patent No.: US 11,655,909 B2
(45) Date of Patent: May 23, 2023

(54) VALVE AND A VALVE ASSEMBLY

(71) Applicant: Haldex Brake Products AB, Landskrona (SE)

(72) Inventors: Carl Mellings, Lindley (GB); Edward Shaw, Lindley (GB); Andreas Jahnke, Landskrona (SE)

(73) Assignee: Haldex Brake Products AB, Landskrona (SE)

( * ) Notice: Subject to any disclaimer, the term of this patent is extended or adjusted under 35 U.S.C. 154(b) by 0 days.

(21) Appl. No.: 16/766,239

(22) PCT Filed: Nov. 21, 2018

(86) PCT No.: PCT/EP2018/082127
§ 371 (c)(1),
(2) Date: May 21, 2020

(87) PCT Pub. No.: WO2019/101817
PCT Pub. Date: May 31, 2019

(65) Prior Publication Data
US 2020/0370672 A1    Nov. 26, 2020

(30) Foreign Application Priority Data

Nov. 21, 2017  (GB) ..................................... 1719309
Apr. 21, 2018  (GB) ..................................... 1806527

(51) Int. Cl.
*F16K 31/06*    (2006.01)
(52) U.S. Cl.
CPC ............................... *F16K 31/0627* (2013.01)

(58) Field of Classification Search
CPC .................................................. F16K 31/0627
See application file for complete search history.

(56) References Cited

U.S. PATENT DOCUMENTS 3,002,498 A * 10/1961 Quayle ................... F15B 13/06
91/521
4,343,329 A    8/1982 Turansky et al.
(Continued)

FOREIGN PATENT DOCUMENTS

CN         1138894 A    12/1996
CN       101592251 A    12/2009
(Continued)

OTHER PUBLICATIONS

Complete Specification of United Kingdom Patent Application No. 852171, filed Aug. 1, 1958, 3 pages.
(Continued)

*Primary Examiner* — Eric Keasel
(74) *Attorney, Agent, or Firm* — Stoel Rives LLP

(57) ABSTRACT

A valve (10) including a first port (12), a second port (14), a third port (16) and a flexure (30), the flexure (30) being moveable between a first position which causes the first port (12) to open, a second position which causes the second port (14) to open, and a third position which causes the first and second ports (12, 14) to close, wherein at least a part of the flexure (30) is magnetisable, to provide a first magnet (32), a second magnet (34) is associated with the first port (12) and a third magnet (36) is associated with the second port (14). A valve assembly includes a pair of valves wherein only one of the valves is operable at any given time.

20 Claims, 6 Drawing Sheets

(56) References Cited

U.S. PATENT DOCUMENTS

| | | | |
|---|---|---|---|
| 4,574,841 A * | 3/1986 | Hugler | F16K 31/082 137/596.17 |
| 4,625,139 A | 11/1986 | Frisch | |
| 6,040,752 A | 3/2000 | Fisher | |
| 6,199,582 B1 | 3/2001 | Matsuzawa et al. | |
| 6,598,621 B1 | 6/2003 | Wygnanski | |
| 6,935,373 B2 | 8/2005 | Wygnanski | |
| 8,613,421 B2 | 12/2013 | Ams et al. | |
| 9,046,187 B2 * | 6/2015 | Wygnanski | F16K 31/082 |
| 9,404,602 B2 | 8/2016 | Cebon et al. | |
| 10,458,440 B2 | 10/2019 | Sarafin et al. | |
| 2003/0168112 A1 | 9/2003 | Wygnanski | |

FOREIGN PATENT DOCUMENTS

| | | |
|---|---|---|
| CN | 201487362 U | 5/2010 |
| CN | 101795910 A | 8/2010 |
| CN | 102918310 A | 2/2013 |
| CN | 104145149 A | 11/2014 |
| DE | 1084096 B | 6/1960 |
| DE | 102016107460 A1 | 10/2017 |
| EP | 1119723 A1 | 8/2001 |
| EP | 2405166 A2 | 1/2012 |
| EP | 2756215 A1 | 7/2014 |
| FR | 697174 A | 1/1931 |
| GB | 852171 A | 10/1960 |
| GB | 2044412 A | 10/1980 |
| GB | 2156047 A | 10/1985 |
| GB | 2395362 A | 5/2004 |
| WO | 2002004851 A1 | 1/2002 |
| WO | 2011138599 A1 | 11/2011 |
| WO | 2013038171 A1 | 3/2013 |
| WO | 2019101401 A1 | 5/2019 |
| WO | 2019101817 A1 | 5/2019 |

OTHER PUBLICATIONS

International Search Report for International Application No. PCT/EP2018/076360, dated Dec. 11, 2018, 16 pages.

International Search Report for International Application No. PCT/EP2018/082127, dated Feb. 15, 2019, 16 pages.

United Kingdom Patent Office, Search Report for Application No. GB1719309.5, dated May 11, 2018, 4 pages.

United Kingdom Patent Office, Search Report for Application No. GB1806527.6, dated Oct. 15, 2018, 3 pages.

* cited by examiner

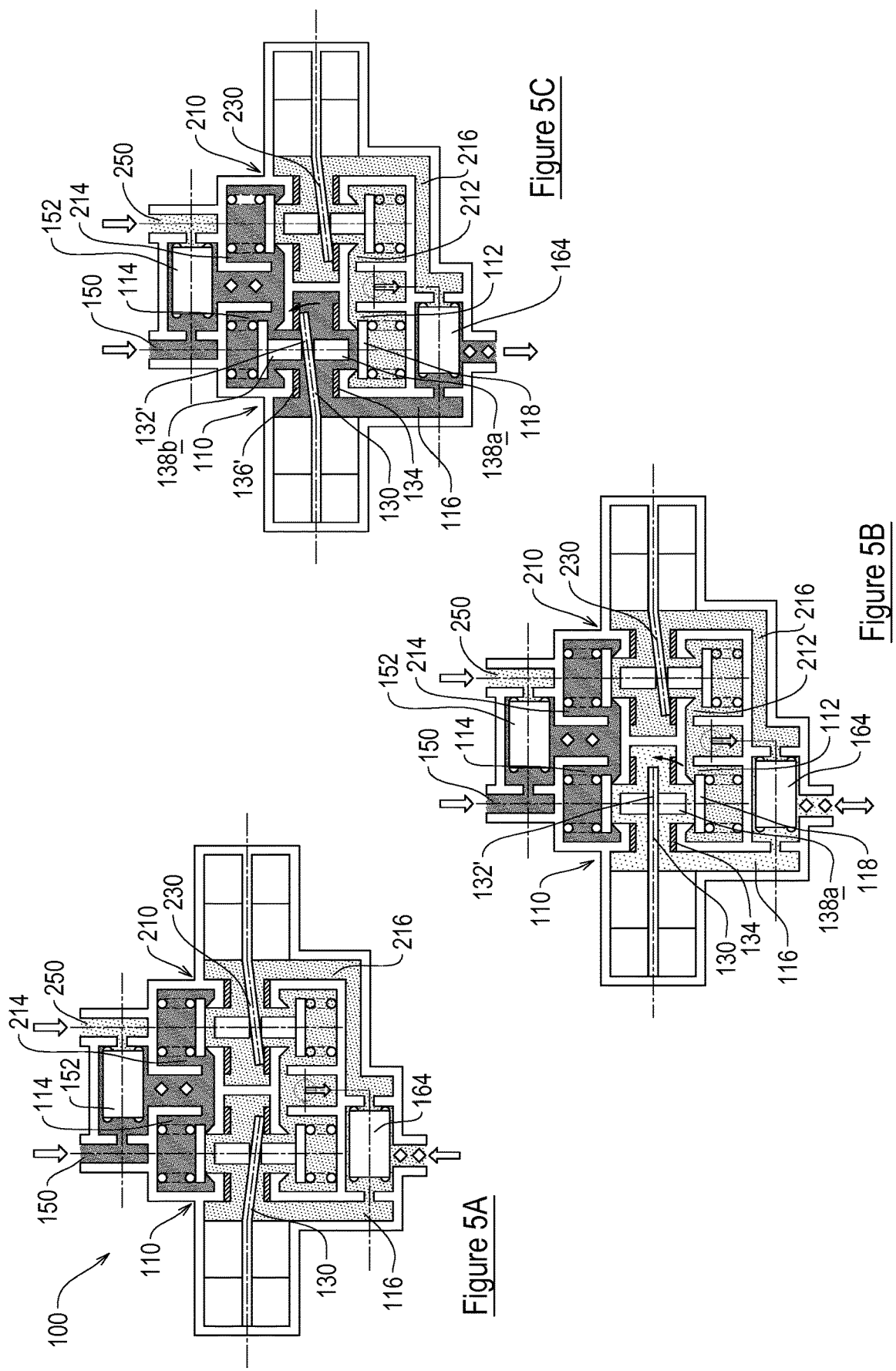

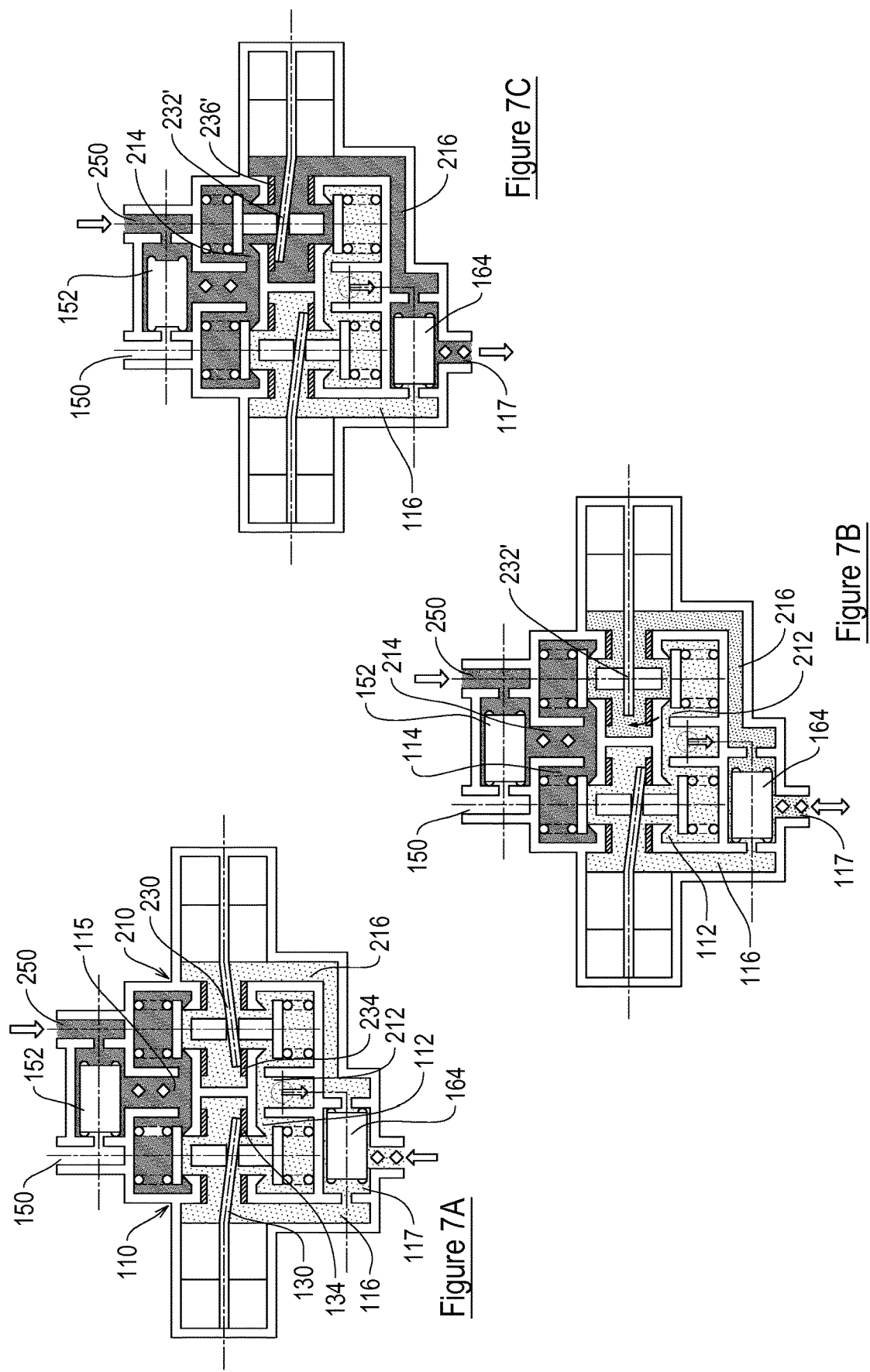

VALVE AND A VALVE ASSEMBLY

RELATED APPLICATIONS

This application is a National Stage of International Application No. PCT/EP2018/082127, filed Nov. 21, 2018, which claims priority of Great Britain Patent Application No. 1719309.5, filed Nov. 21, 2017 and Great Britain Patent Application No. 1806527.6, filed Apr. 21, 2018, all three of which are hereby incorporated by reference in their entireties.

DESCRIPTION OF INVENTION

The present invention relates to a valve, and to a valve assembly, in particular, a flexure valve, which is particularly suitable, but not exclusively, for use in a vehicle braking assembly.

Electromagnetic valves for use in fluid control systems are known. EP2756215 and GB1719309.5 disclose flexure valves which are suitable for use in a vehicle braking assembly. EP2756215 teaches several different forms of flexure assembly. EP2756215 also specifically teaches that such valves can be used in vehicle braking systems—in which fast switching times are required with large pressure differentials across the valve.

Vehicle braking systems typically include a valve assembly known as a modulator which is connected to a source of pressurised fluid, the modulator being used to control and amplify the flow of pressurised fluid to and from a fluid pressure operated brake actuator. The modulator has a supply port which is connected to the source of pressurised fluid, a delivery port which is connected to the brake actuator and an exhaust port which is connected to atmosphere (or any other low pressure volume), and can adopt an apply position, in which fluid is permitted to flow between the supply port and the delivery port of the valve assembly, an exhaust position in which fluid is permitted to flow between the delivery port and the exhaust port, and a hold position in which fluid flow between any two of the supply port, delivery port and exhaust port is substantially prevented.

It is important for certain components of vehicle braking systems to have excellent failsafe capability. The present invention provides improvements in a valve which is suitable for providing failsafe capability within a braking assembly, and also provides an improved valve assembly, which incorporates such a valve.

According to a first aspect of the invention, there is provided a valve including a first port, a second port, a third port and a flexure, the flexure being moveable between a first position which causes the first port to open, a second position which causes the second port to open, and a third position which causes the first and second ports to close, wherein at least a part of the flexure is magnetisable, to provide a first magnet, a second magnet is associated with the first port and a third magnet is associated with the second port.

The first and third magnets may be electromagnets.

The second magnet may be a permanent magnet.

The first port may be an exhaust port, and the first position of the flexure may correspond with a failsafe configuration of the valve.

The second port may be a supply port, and the second position of the flexure may correspond with an apply configuration of the valve.

The third port may be a delivery port, and the third position of the flexure may correspond with a hold configuration of the valve.

The flexure may be part of a flexure assembly which also includes a pair of moveable members, each of the moveable members being moveable, by the flexure, in a direction to open a respective one of the first port and the second port.

According to a second aspect of the invention, there is provided, a method of operating a valve as described in the first aspect of the invention, wherein energisation of the first magnet enables movement of the flexure away from the first position, towards the third position.

Energisation of the first magnet and the third magnet may enable movement of the flexure towards the second position.

According to a third aspect of the invention, there is provided a valve assembly including a first and second valve, each of the first and second valves including a first port, a second port, a third port and a flexure assembly, the flexure assembly being moveable between a first position which causes the first port to open, a second position which causes the second port to open, and a third position which causes the first and second ports to close, wherein at least a part of the flexure is magnetisable, to provide a first magnet, a second magnet is associated with the first port and a third magnet is associated with the second port, and wherein only one of the valves is operable at any given time.

The second valve may provide redundancy.

The valve assembly may include including a primary supply port and a secondary supply port.

The valve assembly may include a third valve which enables the flow of fluid from one of the primary and secondary supply ports to the first and/or second valves whilst inhibiting the flow of fluid from the other of the primary and secondary supply ports to the first and second valves.

The valve assembly may include a shared delivery port, and a further valve which enables the flow of fluid from the first port of one of the first and second valves, whilst inhibiting the flow of fluid from the first port of the other of the first and second valves.

According to a fourth aspect of the invention, there is provided a vehicle braking system including a valve according to the first aspect of the invention and/or a valve assembly according to the third aspect of the invention.

The invention will now be described, by way of example only, with reference to the accompanying drawings, of which:

Figure 4:
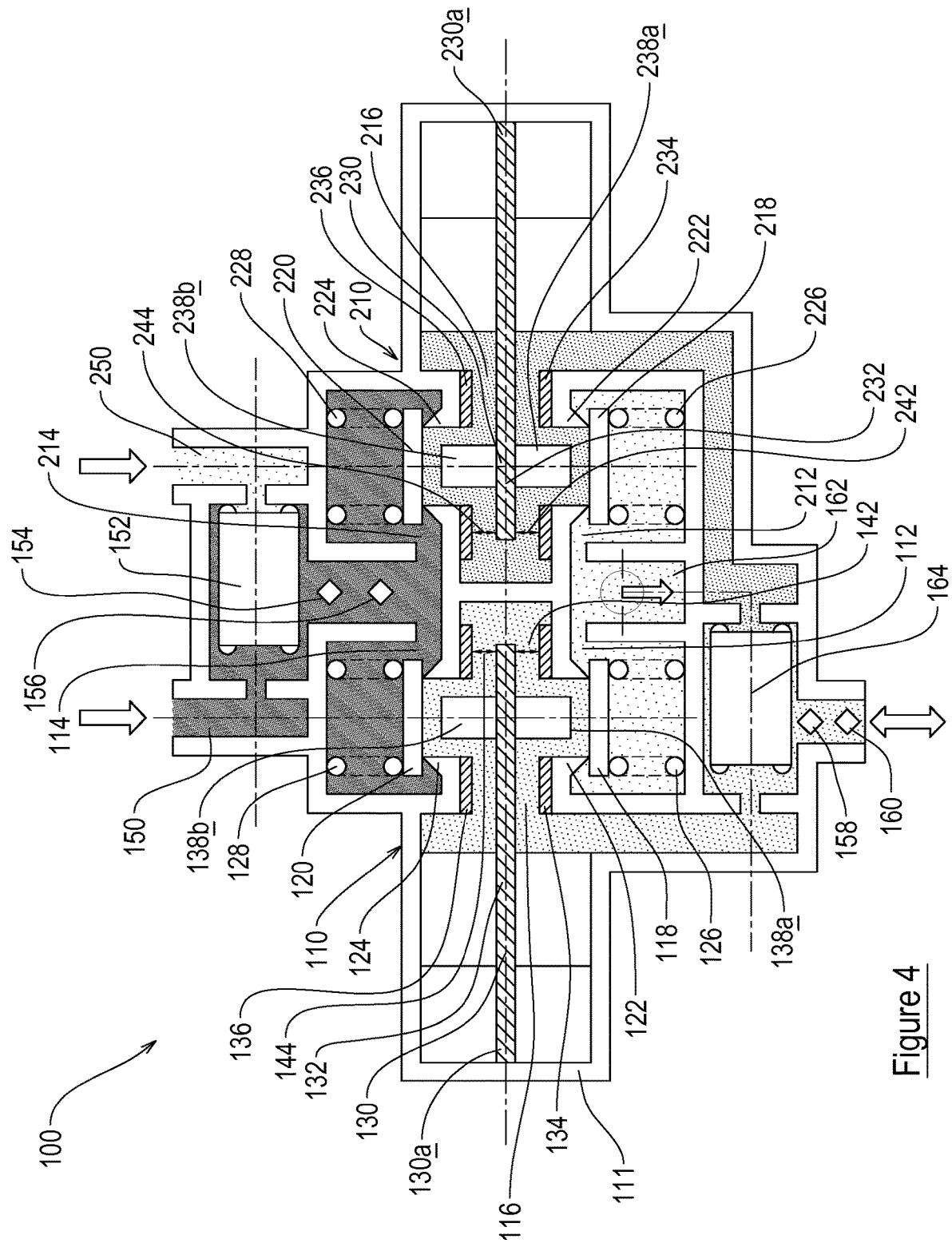
FIG. 4 is a schematic illustration of a valve assembly including a valve of the type illustrated in FIGS. 1-3.
Figure 6A:
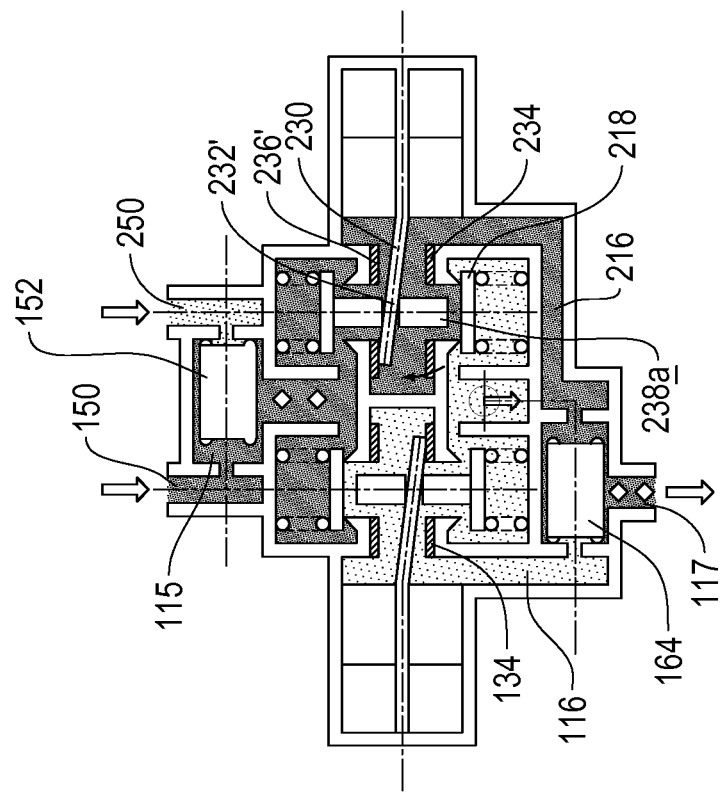
Figure 6B:
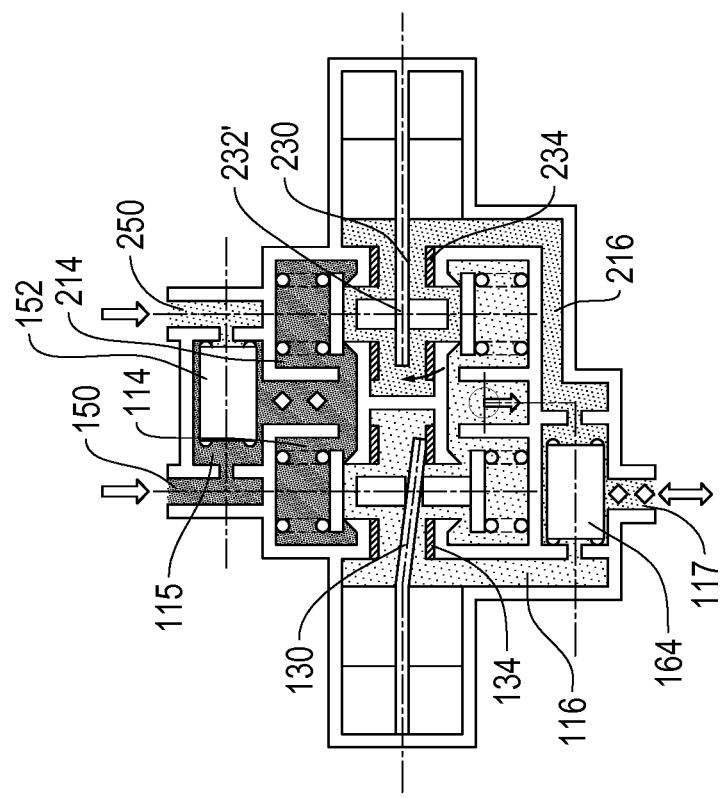

FIGS. 5A-C are schematic illustrations of the valve assembly of FIG. 4 in a primary function mode;

FIGS. 6A and 6B are schematic illustrations of the valve assembly of FIG. 4 in a redundancy mode; and FIGS. 7A-C are schematic illustrations of the valve assembly of FIG. 4 in a mode where a redundancy function is active and there has been a primary air supply failure.

Referring to the figures, there is shown a valve 10. The valve 10 is a three position electromagnetic valve, which includes a housing 11, a first port 12, a second port 14, and a third port 16. In the example shown in FIGS. 1-3, the first port 12, the second port 14 and the third port 16 are an exhaust port 12, a supply port 14 and a delivery port 16, respectively. It will be understood that an alternative arrangement of the ports 12, 14, 16 may be provided.

The valve 10 includes a first valve member 18, which is moveable relative to a first valve seat 22, to open and close the first port 12, and second valve member 20, which is moveable relative to a second valve seat 24, to open and close the second port 14. Each of the valve members 18, 20 is biased towards a closed position, in which it is sealed against its respective valve seat 22, 24, by a respective biasing member 26, 28. Each of the first and second biasing members 26, 28 may be a resilient biasing member, for example a coil spring.

The valve 10 also includes a flexure assembly. The flexure assembly includes a flexure 30, which is manufactured from a flexible or semi-flexible material and includes at least a portion which is magnetisable. The whole of the flexure assembly 30 may be magnetisable. The flexure 30 may include a first magnet 32, which may be an electromagnet (and in such circumstances will hereinafter be referred to as the first electromagnet 32').

The flexure assembly 30 is attached to the housing 11 at a proximal end 30a of the flexure. The proximal end 30a of the flexure 30 may be secured to a yoke 40, from which two adjacent arm portions 40a, 40b may extend. The yoke 40 may include two or more separate parts which form the arm portions 40a, 40b, or may be a monolithic body. The valve seats 22, 24 effectively define respective distal ends of the two adjacent arm portions 40a, 40b. A distal end 30b of the flexure assembly 30 may extend to be located between the distal ends of the two adjacent arm portions 40a, 40b of the yoke 40. In some embodiments, the proximal end 30a of the flexure 30 is clamped by the yoke 40 and may be clamped between the first and second arm portions 40a, 40b thereof, with the distal end 30b extending therefrom in a cantilevered manner. It will be understood that the flexure assembly may be carried by or attached to an additional or alternative part of the valve 10.

The flexure assembly may include a pair of moveable members 38a, 38b, which are located towards the distal end 30b of the flexure 30. Each of the moveable members 38a, 38b may be carried by the flexure 30. The pair of moveable members 38a, 38b may be provided by a single body which is carried by the flexure 30. Each of the moveable members 38a, 38b extends substantially perpendicularly from the flexure 30, however it will be appreciated that other arrangements may be possible. The moveable members 38a, 38b are moveable between a first position in which the first moveable member 38a acts upon the first valve member 18, to move the first valve member 18 against the biasing force of the first biasing member 26, away from the first valve seat 22 to open the first port 12, and a second position in which the second moveable member 38b acts upon the second valve member 20, to move the second valve member 20 against the biasing force of the second biasing member 28, away from the second valve seat 24, to open the second port 14.

A second magnet 34 is associated with and positioned near to the first port 12. The second magnet 34 may be a permanent magnet, and may be a strong magnet such as a Neodymium-iron-boron (NdFeB) magnet. A first air gap 42 is defined between the second magnet 34 and the flexure 30. A third magnet 36 is associated with and positioned near to the second port 14. The third magnet 36 may be an electromagnet (and in such circumstances will hereinafter be referred to as the second electromagnet 36'). A second air gap 44 is defined between the third magnet 36 and the flexure 30. The second and third magnets 34, 36 may be annular, so as to enable fluid flow through the respective port 12, 14 when the respective port 12, 14 is open.

Figure 1:
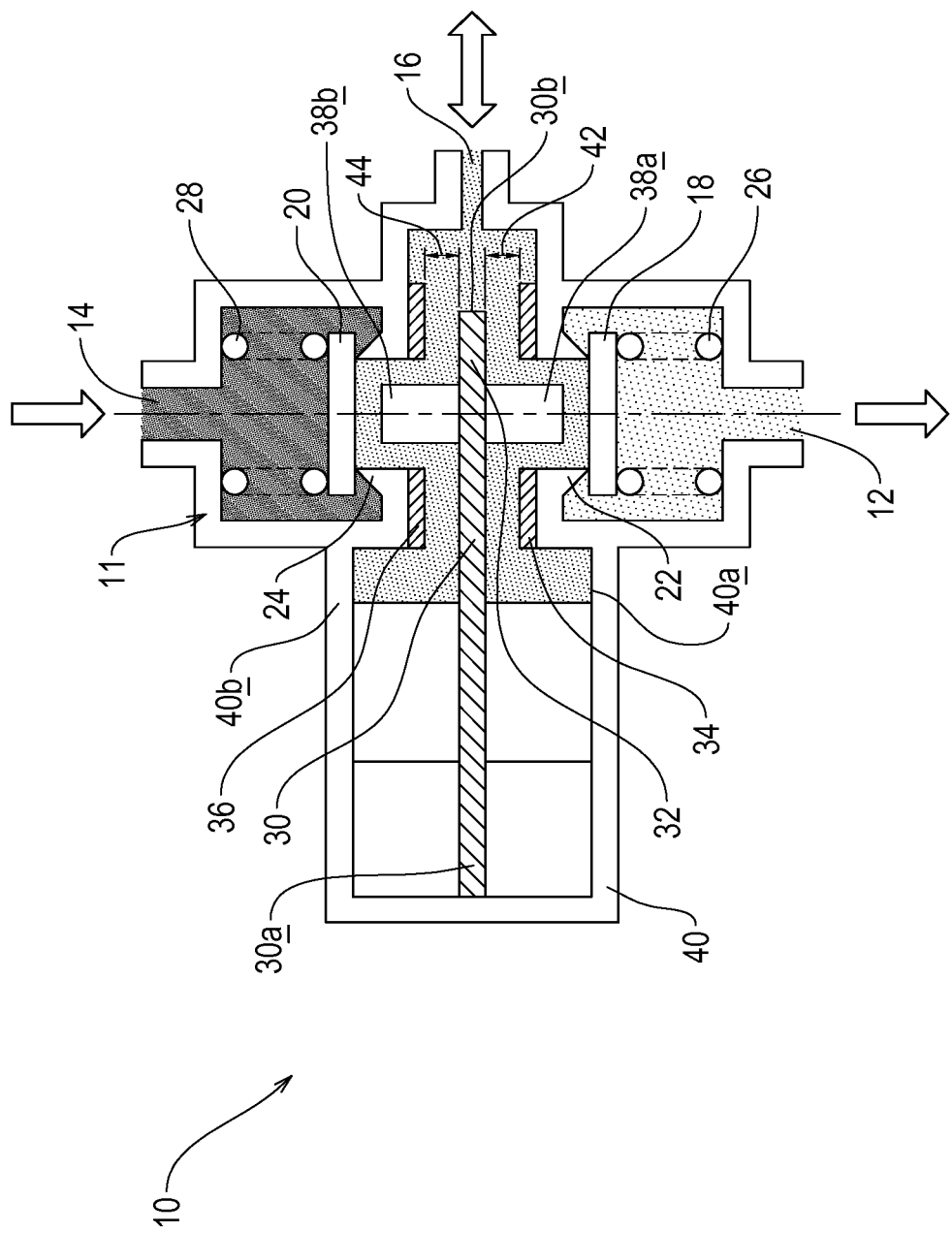
FIG. 1 is a schematic illustration of a valve in accordance with embodiments of the invention, in a 'hold' position.
Figure 2:
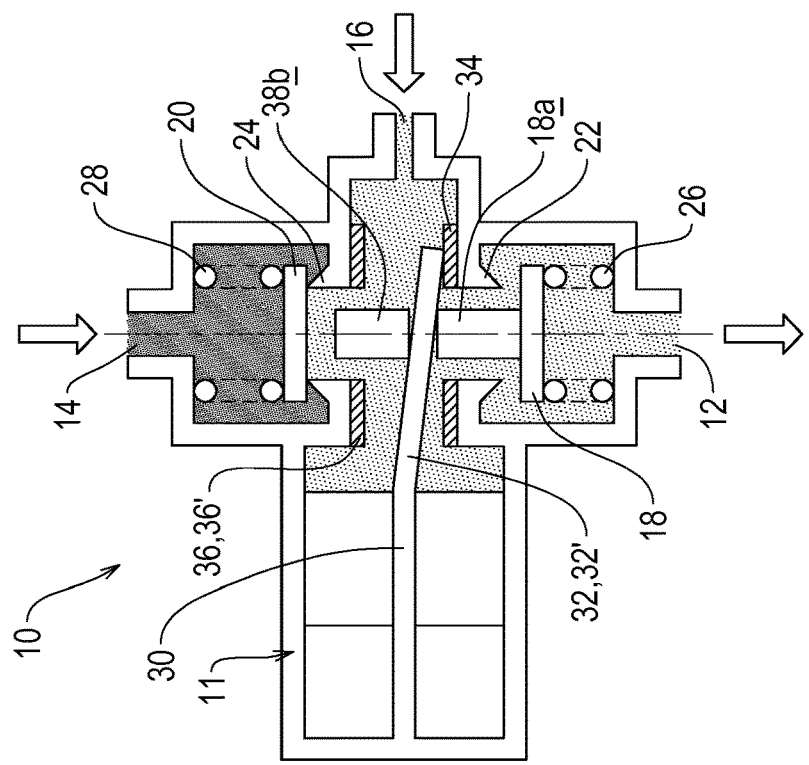
FIG. 2 is a schematic illustration of the valve of FIG. 1, in an 'apply' position.

The distal end 30b of the flexure 30 is moveable between a first position in which it is adjacent the second magnet 34, and hence the first arm portion 40a of the two adjacent arm portions 40a, 40b (see FIG. 3), and a second position, in which it is adjacent the third magnet 36, and hence the second arm portion 40b of the two adjacent arm portions 40a, 40b (see FIG. 2). The flexure 30 has a third position (as shown in FIG. 1), which is intermediate the first and second positions. This third position is the natural position of the flexure 30, and in this position the two air gaps 42, 44 are substantially equal.

The first, second and third magnets 32, 34, 36 form a biasing arrangement, such that the position of the of the flexure 30 may be controlled, in order that the configuration and operation of the valve 10 may also be controlled.

Each of the first and second electromagnets 32',36' may be configured to receive electrical power from a power supply. The power supply may include a power controller which is configured to regulate the power to each of the electromagnets 32',36'.

If the first electromagnet 32' is energised, i.e. if current is provided to the first electromagnet 32' (i.e. to the flexure 30), the magnetic flux of the first electromagnet 32' may be equal in magnitude, but opposite in direction, to that of the second magnet 34. In this situation, the flexure 30 sits in its natural position intermediate the two valve seats 22, 24 as a result of the stiffness of the material from which the flexure is manufactured. This position is referred to as a 'hold' position. In the hold position, the first and second air gaps 42, 44 are substantially equal, and the valve 10 is in a delivery configuration, with the first and second ports 12, 14 closed, and the third port 16 open.

If both the first electromagnet 32' and the second electromagnet 36' are energised, i.e. if current is provided to both the first electromagnet 32', and the second electromagnet 36', then the magnetic flux in a direction opposing that of the second (permanent) magnet 14 is greater than the magnetic flux of the second (permanent) magnet 14. Therefore, the flexure 30 is attracted to the second electromagnet 36', and moves the second moveable member 38b into contact with the second valve member 20, which, in turn, urges the second valve member 20 away from the second valve seat 24, against the biasing force of the second biasing member 28, to open the second port 14, such that fluid communication between the second (supply) port 14 and the third (delivery) port 16 is enabled. This places the valve 10 into an 'apply' configuration. In the apply configuration, the second air gap 44 is reduced to zero, and the first air gap 42 is a maximum, and the first port 12 is closed.

Figure 3:
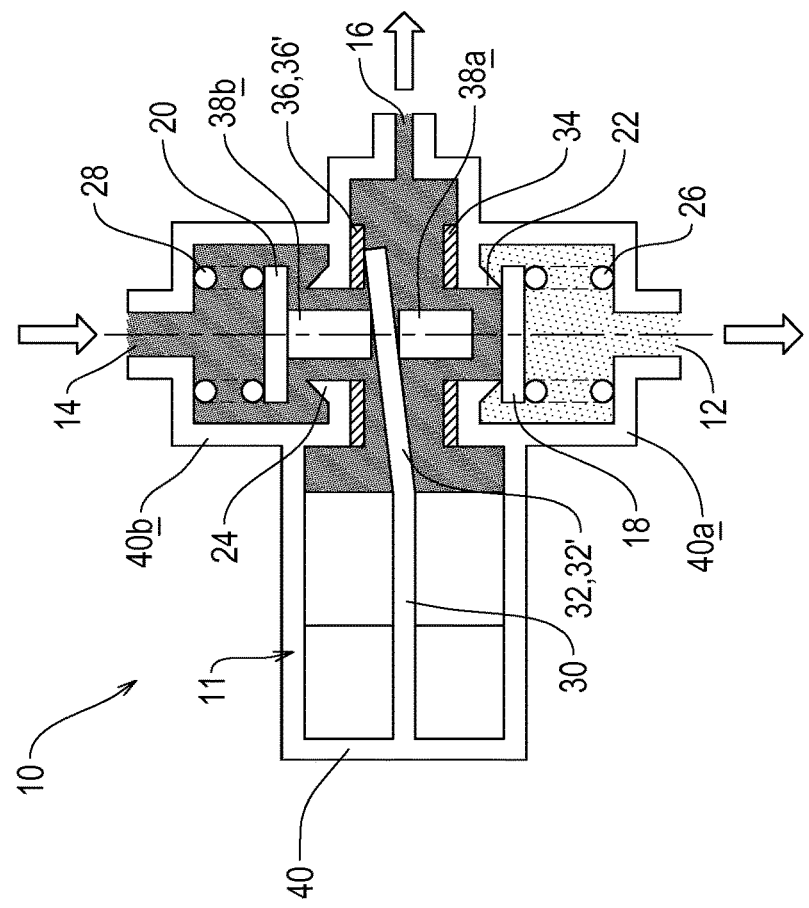
FIG. 3 is a schematic illustration of the valve of FIGS. 1 and 2 in a 'release'/failsafe position.

If neither the first electromagnet 32' nor the second electromagnet 36' is energised, i.e. if the power supply does not provide sufficient current to either of the electromagnets 32',36', to create a large enough magnetic flux to oppose the magnetic flux of the second (permanent) magnet 34, the flexure 30 is attracted to the second (permanent) magnet 14, which moves the first moveable member 38a into contact, or keeps the first moveable member 38a in contact, with the first valve member 18, which, in turn, urges the first valve member 18 away from the first valve seat 22, against the biasing force of the first biasing member 26, opening the first (exhaust) port 12. This moves the valve 10 into an 'exhaust' configuration, such that there is fluid communication between the first (exhaust) port 12 and the third (delivery) port 16. Therefore in the event of loss or reduction of electrical power, the valve 10 is biased towards the exhaust position, which acts as a failsafe position (as shown in FIG. 3). In the exhaust position, the second port 14 is closed.

The valve 10 may be used as part of a modulator valve assembly in a vehicle braking system. The configuration of magnets means that the state of the valve 10 is predictable and controllable, and provides a reliable failsafe mode for a three position valve. It will be appreciated that the configurations of the electromagnets and ports may be different from the configurations depicted in FIGS. 1-3.

Referring now to FIGS. 4-7, there is shown a valve assembly 100. Similar features to those shown in FIGS. 1-3 have similar reference numerals, with a '1' or a '2' prefix.

The valve assembly 100 is suitable for use in a vehicle braking assembly, and may form at least a part of a modulator for a dual-circuit braking system, which includes a primary circuit and a secondary circuit. The valve assembly 100 includes a housing 111, a first valve 110 and a second valve 210. In the example shown in FIGS. 4-7, the first and second valves 110, 210 are substantially identical but a mirror image of one another. The first valve 110 acts as a primary valve and the second valve 210 provides redundancy. Each valve 110, 210 includes the same features as those described above in relation to the valve 10, in particular a first port 112, 212, a second port 114, 214 and a third port 116, 216; a first valve member 118, 218 and a second valve member 120, 220; a first valve seat 122, 222 and a second valve seat 124, 224; a first biasing member 126, 226 and a second biasing member 128, 228; a flexure 130, 230, having a proximal end 130a, 230a and a distal end 130b, 230b and being carried by the housing 111; a first magnet 132, 232 (first electromagnet 132',232'), a second magnet 134, 234, and a third magnet 136, 236 (second electromagnet 136',236'); a first moveable member 138a, 238a and a second moveable member 138b, 238b; a first air gap 124, 224 and a second air gap 144, 244.

The first (exhaust) ports 112, 212 of the first and second valves 110, 210 are communicable with one another, and may be combined to provide a single (exhaust) port 162.

The valve assembly 100 may include a primary supply port 150 and a secondary (redundant) supply port 250. Each of the primary supply port 150 and the secondary supply port 250 is fluidly communicable with the second (supply) port 114, 214 of each of the valves 110, 210 via a third valve, which may be a first shuttle valve 152, for example a double check valve. It will be understood that an alternative valve arrangement may be provided as the third valve, for example a pair of single check valves. The second (supply) ports 114, 214 of the first valve 110 and the second valve 210 are communicable with one another, and also with one or the other of the primary supply port 150 and the secondary supply port 250, via the first shuttle valve 152. The first shuttle valve 152 is moveable between a first position (as shown in FIGS. 5A-C), in which the primary supply port 150 is communicable with the second (supply) port 114, 214 of each of the first and second valves 110, 210; and a second position (as shown in FIGS. 7A-C), in which the secondary supply port 250 is communicable with the second (supply) port 114, 214 of each of the first and second valves 110, 210. The first shuttle valve 152 may be unbiased, to enable the flow of fluid from the supply port 150, 250 which is supplying fluid at the greater pressure.

The valve assembly 100 includes a first primary transducer 154 and a first redundant transducer 156, to determine pressure in the supply ports 114, 214. The first primary transducer 154 and the first redundant transducer 156 may be positioned in a 'shared' region 115 which provides fluid communication between the second (supply) ports 114, 214.

The third (delivery) ports 116, 216 of the first and second valves 110, 210 are fluidly communicable with a shared delivery port 117. A further valve 164, which may be a second shuttle valve, for example a double check valve, may be provided in the shared delivery port 117, to determine which of the first and second valves 110, 210 is fluidly communicable with the shared delivery port 117. An alternative arrangement of the further valve 164 may be provided, for example a pair of single check valves. The valve assembly 100 includes a second primary transducer 158 and a second redundant transducer 160 to determine pressure in the third (delivery) ports 116, 216. The second primary transducer 158 and the second redundant transducer 160 may be provided in a shared region which provides fluid communication between the third (delivery) ports 116, 216 of the first valve 110 and the second valve 210. The provision of the first and second redundant transducers 156, 160 improves the redundancy, and hence the failsafe function, of the valve assembly 100.

The valve assembly 100 may include and/or have electrical power supplied by a single power supply and a single power controller. Alternatively, the valve assembly 100 may include and/or have electrical power supplied by a plurality of power supplies and/or power controllers. The first valve 110, the first primary transducer 154 and the second primary transducer 158 may be powered by a first power supply and a first power controller, whilst the second valve 210, the first redundant transducer 156 and the second redundant transducer 160 may be powered by a second power supply and a second power controller, for example.

Such a valve assembly 100 may be used in a vehicle braking system, for example as part of a wheel end assembly for actuating a braking member.

In use, the second (redundant) valve 210 of such a valve assembly 100 is normally vented, unless a failure is detected in the first valve 110. This arrangement, i.e. a primary operating mode of the valve assembly 100, is shown in FIGS. 5A-C. In practice, the first valve 110 and the second valve 210 may alternate as the primary and secondary valve, in other words, the first valve 110 may operate as the primary valve for one or more braking operations, whilst the second valve 210 acts as the redundant valve, and then the second valve 210 may be operated for one or more braking operations, whilst the first valve 110 acts as the redundant valve, and so on. If a fault is detected in either the first or second valve 110, 210, only the valve 110, 210 which is not exhibiting a fault is operational, which may cause the alternating arrangement to be overridden, FIG. 5A shows the valve assembly 100 in a first arrangement, where the first valve 110 is active and the second (redundant) valve 210 is vented. The second shuttle valve 164 is in a position which enables fluid flow from the delivery port 116 of the first valve 110 and inhibits fluid flow from the delivery port 216 of the second valve 210. The flexure 130 of the first valve 110 is in its default position, i.e. attracted to the second magnet 134 of the first valve 110. In this configuration, the third (delivery) port 116 of the first valve 110 is open to, i.e. fluidly communicable with, the first (exhaust) port 112 of the first valve 110. The flexure 230 of the second valve 210 is also in its default position, however, the third (delivery) port 216 of the second valve 210 is closed by the second shuttle valve 164. The first shuttle valve 152 enables fluid flow from the primary supply port 150 and prevents fluid flow from the secondary supply port 250, however the supply ports 114, 214 of each of the valves 110, 210 are closed, owing to the position of the respective flexure 130, 230. This configuration represents the failsafe position of both valves 110, 210, as the valve assembly defaults to this position in the absence of a sufficient current being applied to any of the electromagnets 132, 232, 136, 236 to move the flexure 130, 230 of either valve 110, 210, but most importantly the flexure 130 of the first valve 110 in the primary operating mode.

FIG. 5B shows a second arrangement of the valve assembly 100. The second shuttle valve 164 is in a position which enables the flow of fluid from the delivery port 116 of the first valve 110 and inhibits the flow of fluid from the delivery port 216 of the second valve 210. A current is applied to first electromagnet 132' of the first valve 110, to energise the first electromagnet 132', so as to position the flexure 130 of the first valve 110 into its intermediate, 'neutral' position, such that the supply port 114 and exhaust port 112 of the first valve 110 are both closed. Thus, only the delivery port 116 of the first valve 110 is open, such that the first valve 110 is in its 'hold' configuration. The flexure 230 of the second valve 210 remains in its default, 'failsafe' position, i.e. with the flexure 230 is positioned towards the second (permanent) magnet 234, such that the exhaust port 212 of the second valve 210 is open.

FIG. 5C shows a third arrangement of the valve assembly 100. In this arrangement, the second shuttle valve 164 is in a position which enables the flow of fluid from the delivery port 116 of the first valve 110 and inhibits the flow of fluid from the delivery port 216 of the second valve 210. A current is applied to the first electromagnet 132' and the second electromagnet 136', to energise both the first and second electromagnets 132',136' sufficiently to overcome the magnetic flux of the second magnet 134, such that the flexure 130 of the first valve 110 is moved towards its second position, i.e. towards the second electromagnet 136', thus opening the supply port 114 of the first valve 110. The first shuttle valve 152 is positioned such that fluid from the primary supply port 150 is receivable in the supply port 114 of the first valve. The secondary supply port 250 is blocked by the first shuttle valve 152. The exhaust port 112 of the first valve 110 is closed, since the flexure 130 of the first valve 110 is in its first position, i.e. away from the second magnet 134, and the first moveable member 138a is positioned away from the first valve member 118 of the first valve 110. This arrangement of the valve assembly 100 enables fluid communication between the primary supply port 150 and the delivery port 116 of the first valve 110.

FIGS. 6A and 6B show the valve assembly in a secondary (redundant) operating mode, with the primary supply port 150 operational.

FIG. 6A shows a fourth arrangement of the valve assembly 100, wherein the first valve 110 is inoperative, and the second valve 210 is operable, to maintain functionality of the valve assembly 100. This situation would occur in the event that, for example, a fault has been detected in the primary pneumatic circuit or in the modulator of a vehicle braking system, so as to ensure continued provision of fluid, i.e. pressurised air, to the or each brake actuator.

The further valve 164 is in a second position which enables the flow of fluid from the delivery port 216 of the second valve 210 and inhibits the flow of fluid from the delivery port 116 of the second valve 110. The second shuttle valve 164 is not biased, and hence is free to move between its first and second positions, to ensure substantially uninterrupted delivery of fluid via the shared delivery port 117, in this case, from the second valve 210, since the first valve 110 has been rendered inoperative owing to a failure. Thus, the second valve 210 provides redundancy for the first valve 110.

A current is applied to first electromagnet 232' of the second valve 210, so as to position the flexure 230 of the second valve 210 in its intermediate, 'neutral' position, such that the second valve 210 is in its 'hold' configuration, the supply port 214 and the exhaust port 212 of the second valve 210 both being closed. Thus, only the delivery port 216 of the second valve 210 is open. The flexure 130 of the second valve 110 remains in its default, failsafe position, i.e. towards the second (permanent) magnet 134 such that the delivery port 116 of the first valve 110 is open. The primary supply port 150 is operational, such that the first check valve 152 is in its first position, enabling the flow of fluid from the primary supply port 150 to the second (supply) port 114, 214 of each of the first and second valves 110, 210. However, the supply port 114, 214 of each of the first and second valves 110, 210 is closed as a result of the position of the respective flexure assembly 130, 230.

FIG. 6B shows a fifth arrangement of the valve assembly 100. In this mode, the first valve 110 is inoperative, for example as a result of a failure in the first valve 110 and the second valve 210 is operative, to provide redundancy in the valve assembly 100. The second shuttle valve 164 is in a position which enables the flow of fluid from the delivery port 216 of the second valve 210 and inhibits the flow of fluid from the delivery port 116 of the first valve 110. A current is applied to the first electromagnet 232' and the second electromagnet 236' of the second valve 210 to energise both electromagnets 232',236' of the second valve 210, such that the flexure 230 of the first valve 210 is moved towards its second position, i.e. towards the second electromagnet 236', thus opening the supply port 214 of the second valve 210. The first shuttle valve 152 is positioned such that fluid from the primary supply port 150 is receivable in the supply port 114 of the first valve 110. The secondary supply port 250 is blocked by the first shuttle valve 152, as fluid is being supplied via the primary supply port 150. The exhaust port 212 of the second valve 210 is closed, since the flexure 230 of the second valve 210 is in its second position, i.e. away from the second magnet 234, and the first moveable member 238a is positioned away from the first valve member 218 of the second valve 210. This configuration of the valve assembly 100 enables fluid communication between the primary supply port 150 and the delivery port 216 of the second valve 210, such that the valve assembly 100 is in an 'apply' configuration.

FIGS. 7A-C show the valve assembly 100 in the event of a failure of the primary air supply circuit (upstream of or at the primary supply port 150), and in the event of a failure of the first valve 110 causing operation of the second valve 210.

FIG. 7A shows the valve assembly in a sixth arrangement, at a point of failure in the primary circuit. Fluid is not flowing through the primary supply port 150, owing to a failure in the primary circuit. Therefore, the first shuttle valve 152 moves to its second position, blocking the primary supply port 150, as a result of fluid being supplied via the secondary supply port 250, and hence greater pressure being experienced on the secondary side of the shuttle valve 152. Both valves 110, 210 are in their respective failsafe positions, with the flexure assemblies 130, 230, being in their respective first positions, i.e. attracted to the respective second magnets 134, 234, such that the supply port 114, 214 of each valve 110, 210 is closed, and the exhaust port 112, 212 of each valve 110, 210 is open. The further valve 164 is in its first position, such that any fluid remaining in the first delivery port 116 is vented to exhaust.

FIG. 7C shows the valve assembly in a seventh arrangement, with fluid being supplied via the secondary supply port 250, and the first shuttle valve 152 blocking the primary supply port 150, as in FIG. 7A. In this arrangement, current is applied to both the first electromagnet 232', and to the second electromagnet 236', to urge the flexure assembly 230 of the second valve 210 into its 'apply' configuration, i.e. with the flexure 230 causing the supply port 212 of the second valve 210 to be held open. In this configuration, fluid communication between the secondary supply port 250 and the shared delivery port 117 is possible via the second valve 210, i.e. via the delivery port 216 of the second valve 210. The pressure on the secondary side of the further valve 164 urges the further valve 164 to inhibit fluid communication between the delivery port 116 port of the first valve 110 and the shared delivery port 117.

FIG. 7B shows the valve assembly in an eighth arrangement, with fluid being supplied via the secondary supply port 250, and the first shuttle valve blocking the primary supply port 150, as in FIG. 7A. In this arrangement, current is applied to the first electromagnet 232' of the second valve 210, to hold the flexure 230 of the second valve 210 in its neutral, intermediate position, as described above. This has the effect of closing both the supply port 112 and the exhaust port 212 of the second valve, such that the second valve 210 is in its 'hold' configuration, with fluid being supplied to the delivery port 216 of the second valve 210, since the further valve 164 inhibits fluid communication between the delivery port 116 of the first valve 110 and the shared delivery port 117, but enables fluid communication between the delivery port 216 of the second valve 210 and the shared delivery port 117. The first valve 110 remains in its failsafe mode, with the flexure assembly causing the exhaust port 112 to be held open, thus enabling fluid in the delivery port 116 of the first valve 110 to vent to exhaust.

Since the pressure on the secondary side of the further valve 164 is greater than that on the primary side, as a result of the first valve 110 being in its failsafe mode, and the second valve 210 being in its hold mode, the further valve 164 is urged into its second position to allow fluid communication between the delivery port 216 of the second valve 210 and the shared delivery port 117, and to inhibit fluid communication between the delivery port 116 of the first valve and the shared delivery port 117.

An advantage of the valve assembly 100 is that redundancy for the supply of fluid, i.e. pressurised air, is provided, as well as providing redundancy within the valve assembly itself, to ensure continued operation of the valve assembly 100 in the event of failure of one of the valves 110, 120. The configuration of each of the valves 110, 210 is such that each three position valve 110, 210 has a reliable failsafe mode.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A valve assembly, comprising:
a first and second valve, each of the first and second valves including a first port, a second port, a third port, and a flexure assembly, the flexure assembly is configured to move to and maintain a first position which causes the first port to open, a second position which causes the second port to open, and a third position which causes the first and second ports to close,
wherein at least a part of the flexure assembly is magnetisable, to provide a first magnet, a second magnet is associated with the first port and a third magnet is associated with the second port,
wherein one valve is configured to maintain a default failsafe position corresponding to the first position while the other valve transitions between the first, second, and third positions, and
wherein the one valve is configured to transition between the first, second, and third positions so as to act as a redundancy for the other valve in the event the other valve cannot transition between the first, second, and third positions.

2. A valve assembly according to claim 1 including a primary supply port and a secondary supply port.

3. A valve assembly according to claim 2 including a third valve which enables the flow of fluid from one of the primary and secondary supply ports to the first and/or second valves whilst inhibiting the flow of fluid from the other of the primary and secondary supply ports to the first and second valves.

4. A valve assembly according to claim 1 including a shared delivery port, and a further valve which enables the flow of fluid from the first port of one of the first and second valves, whilst inhibiting the flow of fluid from the first port of the other of the first and second valves.

5. A valve assembly according to claim 1, wherein the first and third magnets are electromagnets.

6. A valve assembly according to claim 5, wherein an energisation of the first magnet enables a movement of the flexure assembly away from the first position, towards the third position.

7. A valve assembly according to claim 5, wherein energisations of the first magnet and the third magnet enable a movement of the flexure assembly towards the second position.

8. A valve assembly according to claim 1, wherein the second magnet is a permanent magnet.

9. A valve assembly according to claim 8, wherein the permanent magnet comprises a neodymium-iron-boron (NdFeB) magnet.

10. A valve assembly according to claim 1, wherein the second and third magnets are annular and enable a flow of fluid through the first port and the second port, respectively, of each of the first valve and the second valve.

11. A valve assembly according to claim 1, wherein the first, second, and third magnets associated with each valve form a biasing arrangement, and wherein the biasing arrangement controls a position of the flexure assembly of each of the first valve and the second valve.

12. A valve assembly according to claim 1, wherein the position of the flexure assembly of each of the first valve and the second valve controls an operation of the first valve and the second valve, respectively.

13. A valve assembly according to claim 1, wherein the first port of the first valve comprises a first exhaust port, the first port of the second valve comprises a second exhaust port, and the first and the second exhaust ports are communicable with one another to provide a single third exhaust port.

14. A valve assembly according to claim 1, wherein the flexure assembly further includes a pair of moveable members, each of the moveable members being moveable in a direction to open a respective one of the first port and the second port of each of the first valve and the second valve.

15. A valve assembly according to claim 14 further comprising a housing, wherein the flexure assembly of each of the first and the second valve is attached at the housing at a proximal end of a respective flexure, and a distal end of each of the respective flexure extends in a cantilevered manner.

16. A valve assembly according to claim 1, wherein the second valve is normally vented, unless a failure is detected in the first valve.

17. A valve assembly according to claim 16 further comprising a primary operating mode.

18. A valve assembly according to claim 17, wherein the primary operating mode comprises at least three configurations.

19. A valve assembly according to claim 1, wherein a failure detected in the first valve causes the second valve to be operable.

20. A vehicle braking system including a valve assembly according to claim 1.

\* \* \* \* \*